W. G. SMITH.
ELASTIC WEBBING.
APPLICATION FILED JUNE 27, 1910.
993,803.
Patented May 30, 1911.
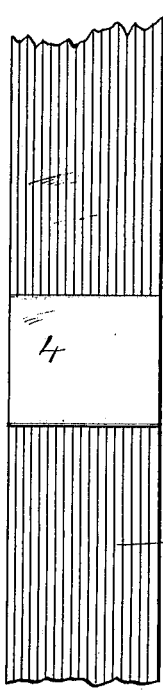
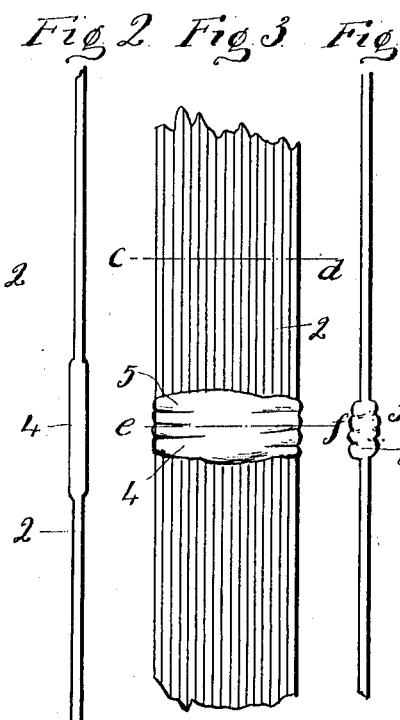
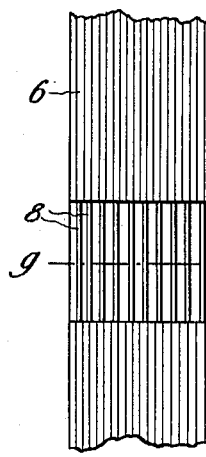
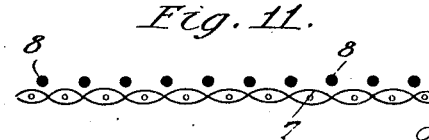
Witnesses
C. J. Reed.
C. L. Weed.
Inventor
William G. Smith
By Atty's
Seymour & Earle

UNITED STATES PATENT OFFICE.

WILLIAM G. SMITH, OF MIDDLETOWN, CONNECTICUT, ASSIGNOR TO THE RUSSELL MANUFACTURING CO., OF MIDDLETOWN, CONNECTICUT, A CORPORATION.

ELASTIC WEBBING.

993,803.  Specification of Letters Patent.  Patented May 30, 1911.

Application filed June 27, 1910. Serial No. 569,138.

*To all whom it may concern:*

Be it known that I, WILLIAM G. SMITH, a citizen of the United States, residing at Middletown, in the county of Middlesex and State of Connecticut, have invented a new and useful Improvement in Elastic Webbing; and I do hereby declare the following, when taken in connection with the accompanying drawings and the characters of reference marked thereon, to be a full, clear, and exact description of the same, and which said drawings constitute part of this specification, and represent, in—

Figure 1 a broken plan view of a length of elastic webbing constructed in accordance with my invention and shown as under tension. Fig. 2 an edge view thereof. Fig. 3 a view corresponding to Fig. 1 but with the tension removed from the webbing. Fig. 4 an edge view thereof. Fig. 5 a view showing a short length of the webbing with the non-elastic tube at one end thereof cut preparatory to stitching through it. Fig. 6 a view of the webbing in longitudinal section on an enlarged scale and shown as cut transversely through the stitching section. Fig. 7 a diagrammatic view of the webbing in transverse section on the line *c—d* of Fig. 3. Fig. 8 a corresponding view on the line *e—f* of Fig. 3. Fig. 9 a broken plan view of a modified form which webbing made in accordance with my invention may assume. Fig. 10 a diagrammatic view thereof in longitudinal section. Fig. 11 a diagrammatic view thereof in transverse section on the line *g—h* of Fig. 9.

My invention relates to an improvement in elastic webbing of the kind which is woven with particular reference to the production of sewing sections which provide for sewing the webbing in place without the impairment of its elastic sections due to the creeping of the rubber strands in case the same are cut or broken by the needle in sewing the fabric in place, the object of my present invention being to produce at a low cost for manufacture, and without waste, superior elastic webbing of the character described.

With these ends in view my invention consists in a length of elastic webbing having an elastic section and a non-elastic sewing section, both woven with the warp threads and the rubber strands at the same tension, and the non-elastic sewing section being woven to exclude the rubber strands from the mesh of the fabric.

My invention further consists in certain details of construction as will be hereinafter described and pointed out in the claims.

In carrying out my invention as illustrated by Figs. 1 to 8 inclusive of the drawings, the elastic sections 2 and the non-elastic tubular sewing sections 4 are produced in alternation in a loom in which the warp threads and rubber strands 3 are maintained at a uniform tension, but which is set so that without changing the tension of the warp threads or of the rubber strands, the latter are excluded from the mesh during the weaving of the non-elastic sewing sections. When webbing so produced is removed from the loom, the elastic sections 2 of the webbing are contracted as usual by the contraction of the rubber strands 3 which they confine, while the contraction of the excluded rubber strands causes the flat tubular non-elastic sewing sections 3 to be puckered up into bag-like pouches 5 as shown in Figs. 3 and 4. The rubber strands contained in these bag-like pouches 5 being under no tension whatever, are free and exposed to contact with each other. In using the webbing it must first be put under tension so as to extend its non-elastic sewing sections 2 to the limit of their extensibility, those portions of the rubber strands 3 contained within them being also extended to the same extent as during the weaving operation. When so extended, *i. e.*, with the pucker taken out, the sewing sections 2 are then transversely cut midway of their length. The free ends of the rubber strands will then contract as shown in Fig. 6, within the ends of the short open non-elastic tubes produced by cutting the sewing in two transversely as described. These free ends of the rubber being relieved of all tension, return to their normal size, and are therefore larger in diameter than those portions of the same strands which are woven into the elastic sections of the webbing and form, as it were, plugs or stops as also shown in Fig. 6 so that any subsequent stretching of the elastic portions of the webbing will fail to cause the plug-like free ends of the rubber strands to creep into the elastic portions of the webbing. The free rubber ends are, it may be added, larger in diameter than the rubber-strand-receiving channels produced in the elastic sections of the webbing as the same is woven.

In the modified construction shown by Figs. 9 to 11 inclusive of the drawings, the loom is set so as to maintain the warp threads and the rubber strands 8 at the same tension during the weaving of the alternating elastic sections 6 and sewing sections 7, but the loom is further set so that throughout the weaving of the non-elastic sewing sections 7 of the webbing, the extended or stretched rubber strands 8 will be entirely excluded from the mesh of the fabric which instead of being woven in tubular form surrounding the unconfined or naked strands will be woven in the form of a flat strap or band located entirely to one side of the strands as clearly shown in Figs. 10 and 11, it being immaterial whether the sewing sections thus produced are tubular or not. When such webbing is removed from the loom and the rubber strands are allowed to contract, their exposed portions will resume their normal size and consequently be prevented from creeping into the elastic portions of the webbing since the rubber-strand-receiving channels therein are smaller than the diameter of the rubber when the same is wholly relieved of tension. In using such webbing it must be placed under tension in order to facilitate its being cut up into short lengths, as for instance, on the line $g—h$ of Fig. 9. When the webbing is cut up, the half lengths of exposed rubber strands contract and resume their normal size and constitute, as it were, plugs which are prevented by their size from creeping into the elastic-sections of the webbing.

The non-elastic sewing sections of the webbing may be sewed through in working the webbing up into garment-supporters or what not, without in any way impairing the webbing, since the rubber strands are entirely excluded from those portions of the webbing through which the needle passes.

I claim:—

1. A length of elastic webbing having an elastic section and a non-elastic sewing section, both the elastic section and the sewing section being woven with their warp threads and their rubber strands at the same tension, and the sewing section being woven to exclude the rubber strands from the mesh of the fabric.

2. A length of elastic webbing having an elastic section and a non-elastic tubular sewing section, both woven with their warp threads and their rubber strands at the same tension, and the non-elastic tubular sewing section being woven to exclude the rubber strands from the mesh of the fabric.

In testimony whereof, I have signed this specification in the presence of two subscribing witnesses.

WM. G. SMITH.

Witnesses:
A. S. LOZEY,
J. L. DOLBEARE.